(12) United States Patent
Brink

(10) Patent No.: US 6,454,080 B1
(45) Date of Patent: Sep. 24, 2002

(54) SCRAPER ARRANGEMENT

(75) Inventor: Jan Louis Brink, Johannesburg (ZA)

(73) Assignee: SLIC Trading Company Limited, Belize City (BZ)

( * ) Notice: Subject to any disclaimer, the term of this patent is extended or adjusted under 35 U.S.C. 154(b) by 0 days.

(21) Appl. No.: 09/527,719

(22) Filed: Mar. 17, 2000

(30) Foreign Application Priority Data

Mar. 19, 1999  (ZA) ................................. 99/2204

(51) Int. Cl.[7] ............................................. B65G 45/12
(52) U.S. Cl. ..................................................... 198/497
(58) Field of Search .................. 198/497, 499

(56) References Cited

U.S. PATENT DOCUMENTS

| | | | | |
|---|---|---|---|---|
| 4,533,035 A | * | 8/1985 | Reiter | 198/499 |
| 5,007,523 A | * | 4/1991 | Morefield | 198/497 |
| 5,197,587 A | * | 3/1993 | Malmberg | 198/499 |
| 5,950,803 A | * | 9/1999 | Schwarze | 198/499 |

* cited by examiner

*Primary Examiner*—Joseph E. Valenza
(74) *Attorney, Agent, or Firm*—Kinney & Lange, P.A.

(57) ABSTRACT

A scraper assembly cartridge which includes a base, a bracing member which extends from the base, and a plurality of scraping elements which are fixed to the bracing member. The base of the cartridge is engaged with an elongate member which extends transversely to a conveyor belt so that scraping edges of the scraping elements are on or below a line which extends radially from a center of a head pulley to an axis about which the member and the base are pivotally movable.

14 Claims, 2 Drawing Sheets

SCRAPER ARRANGEMENT

BACKGROUND OF THE INVENTION

This invention relates to a scraper arrangement for a conveyor belt.

Conveyor belts which are used for transporting fine material which may be damp or wet can pose particular problems. For example fine ash which is produced in a power station can, especially as a result of ash collection techniques, become damp or wet and when conveyed on a belt can adhere to the belt and build up substantial bulky deposits of ash which may be difficult to remove.

A conveyor belt is scraped clean by means of a primary or secondary scraper, or both. A primary scraper is used to effect an initial scraping action while a secondary scraper is used with a finer scraping action to remove remaining residual material.

Primary and secondary scrapers have been strengthened so that they can remove packed bulky material of the kind referred to. Although this approach may hold certain benefits it is found that the strengthened scrapers are then too stiff and are not able to exhibit a normal scraping action.

A need therefore exists for some means which is capable of removing sticky packed material of the kind referred to but without interfering with the designed or intended scraping action of a secondary scraper or a primary scraper if one is used.

SUMMARY OF INVENTION

The invention provides, in the first instance; a scraper assembly cartridge which includes a base, a bracing member which extends from the base, and a plurality of scraping elements which are fixed to the bracing member.

Preferably the base is channel shaped with opposing spaced lips.

Preferably the bracing member is rigid and the scraping elements are rigidly fixed in line with one another to the bracing member.

The invention also provides a scraper arrangement for a conveyor belt which passes around a head pulley, the scraper arrangement including at least one scraping element with a scraping edge, the scraping element being mounted opposing the belt as it passes around the head pulley and the scraping edge being spaced from the conveyor belt.

The scraping edge may be spaced from an outer surface of the conveyor belt by any appropriate distance and for example may be spaced by a maximum of 6 mm and, preferably, by a distance of approximately 4 mm, depending on the degree of roundness of the conveyor pulley and variations, in the thickness of the conveyor belt along its length.

The scraper arrangement may include at least one support, and at least one arm which is mounted for limited pivotal movement about an axis relatively to the support, the said at least one scraping element being fixed directly or indirectly to the arm.

The scraping edge may be positioned so that it is on or below a line which extends radially from the centre of the head pulley to the said axis. This arrangement resists material passing between the scraping edge and the pulley surface yet allows the scraper assembly to pivot about the axis should there be a permanent or significant obstruction on the conveyor belt.

The scraping element may be mounted to a member which extends transversely to the direction in which the belt moves and which is engaged with two of the said arms located respectively on opposing sides of the belt.

The arms and the member may be pivotal in unison about the said axis.

Each scraping element may be fixed to a base which is engageable in any appropriate manner with the transverse member. Preferably the base is engageable with a sliding action with the member.

The base may be in the shape of a channel and include lips which enable the base to be engaged with a sliding action with the member but which prevent the base from being directly disengaged from the member by moving the base in a direction which is transverse to the direction in which the member extends.

A plurality of scraping elements may be positioned side by side and in line with one another on the base.

Means may be provided for adjusting the position of the axis relatively to the belt. Such means may be adjusted for moving the axis towards or away from the belt according to requirement.

According to a different aspect of the invention there is provided a scraper arrangement for a conveyor belt which passes around a head pulley, the scraper arrangement including at least one scraping element which is mounted for limited pivotal movement about an axis and which has a scraping edge which is positioned below a line which extends radially from a centre of the head pulley to the said axis.

BRIEF DESCRIPTION OF THE DRAWINGS

The invention is further described by way of example with reference to the accompanying drawings in which.

DESCRIPTION OF PREFERRED EMBODIMENT

Figure 1:
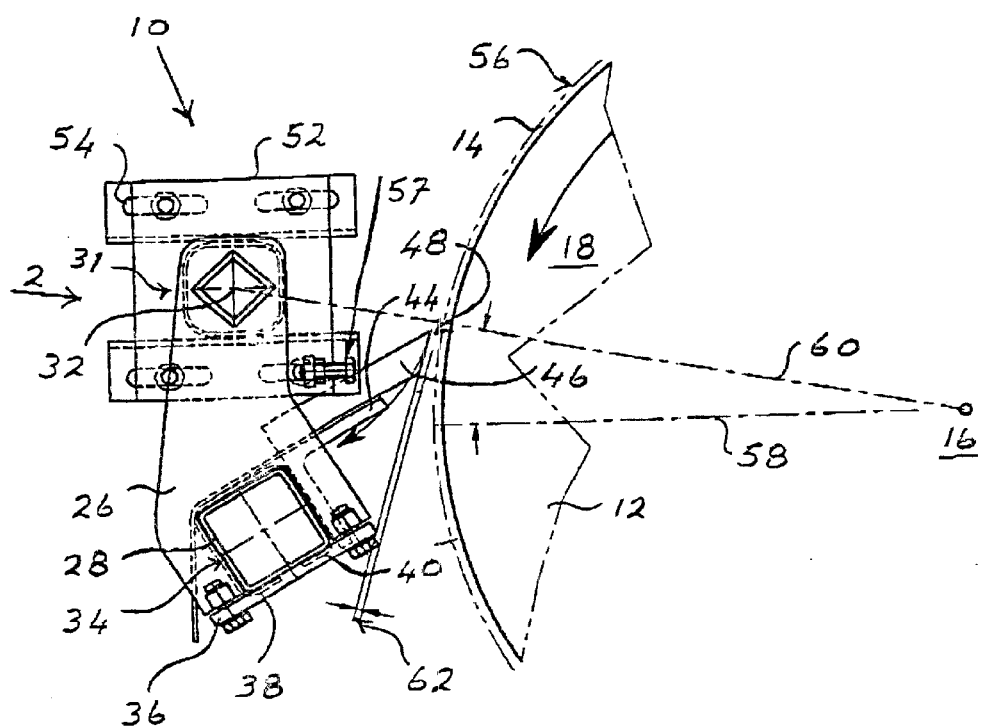
FIG. 1 is a side view of a scraper arrangement according to the invention mounted to exert a scraping action on a conveyor belt.

The accompanying drawings illustrate a scraper arrangement 10 according to the invention mounted adjacent a head pulley 12 over which passes a conveyor belt 14. The head pulley is rotatable about a central axis 16.

The arrangement of the head pulley and the belt is conventional and is not further described herein.

The belt is movable in the direction of an arrow marked 18 as the head pulley rotates about the axis 16.

A primary scraper (not shown) or a secondary scraper (not shown), or both, which may be of any appropriate and conventional construction may be positioned downstream of the scraper arrangement 10 to operate in a normal manner to scrape material from an outer surface of the belt. Again it is mentioned that these aspects are known in the art and consequently are not further described herein.

The scraper arrangement is thus used in addition to a conventional secondary scraper or a primary scraper, or both, if installed on the belt.

The arrangement 10 includes two spaced supports 20 and 22 respectively which are located on opposing sides of the belt 14, two arms 24 and 26 respectively which extend from the supports 20 and 22, an elongate member 28 which is fixed to the arms and which extends transversely to the belt 14, and a scraper assembly 30 which is engaged with the member 28.

The supports 20 and 22 include resilient bush mechanisms 31 which provide a resilient biassed support for the respective arms. This support enables the arms to be moved to a limited extent, with a pivotal action, about an axis 32 extending through the supports. This type of resilient support is known in the art and consequently is not further described herein.

The member 28 is made from a length of tubing and it is bolted to the arms, passing through respective recesses 34, using fixing or clamping plates 36, or any other means.

The scraper assembly 30 is preferably provided as a pre-assembled cartridge which includes an elongate base 38 which is shown in FIG. 1 in dotted outline and which is channel shaped with opposing spaced lips 40. This construction enables the base 38 to be slid onto the member 28 as is indicated by means of an arrow 42 in FIG. 2 The lips secure the base 38 to the member 28 and prevent the scraper assembly from being moved in a direction which is transverse to the longitudinal direction of the member 28. Thus the base can only be engaged with the member, or disengaged from the member, with a sliding type action.

A length of angle or flat iron 44 is fixed to and extends from the base 38 and acts as a rigid bracing member to which a number of scraping elements or blades 46, which are made from a ceramic or similar wear resistant material, are fixed, in line with one another, using techniques which are known in the art. Each scraping element defines a scraping edge 48 which may be tapered.

The cartridge, which makes up the scraper assembly 30, thus includes the channel-shaped base 38 with the rigid bracing member to which the scraping blades 46 are mounted, preferably rigidly.

The supports 20 and 22 are mounted to fixed structure 50, adjacent the belt 14, using mounting plates 52 which are formed with slots 54 to enable the arms, and hence the axis 32, to be moved towards or away from an outer surface 56 of the belt. One or more travel stop screws 57 are used to limit movement of the arms 26 so as to prevent the scraping edges 48 from coming into contact with the belt surface 56. The screws 57 are also used to set the arms 24, 26 to a particular angular orientation relatively to the mechanisms 31 so that a desired pre-tension force is generated via a reaction force which is set up by the resilient bush mechanisms in the supports 20 and 22 as the screw or screws are advanced to bear against the arms 24, 26.

It is stressed that the scraper arrangement 30 is made so that it is particularly robust and has heavy duty capabilities. The flexible or resilient bushings used in the supports 20 and 22 are substantially stiff when compared to the stiffness of bushings used in conventional secondary and primary scrapers. The function of the scraper assembly 30 is to remove obstinate and sticky material which is packed, often densely and in bulk, on the outer surface 56. However the function of the scraper element is not necessarily to remove all of the material from the belt. Thus the scraper assembly is used in conjunction with a secondary scraper or a primary scraper, or both, when installed. The secondary scraper and the primary scraper are used to scrape the belt in a traditional manner while the scraper assembly 30 is used to remove the bulk of the material which normally cannot be removed with existing primary or secondary scrapers.

The scraper assembly 30 is installed adjacent the head pulley 12. The axis 32 is positioned above a horizontal centre line 58 which passes through the axis 16 of the head pulley 12. The scraping edges 48 are positioned so that they are in line with, but preferably are slightly below, a line 60 which extends radially from the axis 16 to the axis 32. The arms are adjusted using the slotted plates 52 so that a gap 62 is established between the scraping edges 48 and the outer surface 56 of the belt. The maximum size of this gap is of the order of 6 mm, and preferably is about 4 mm. The gap size depends on the roundness of the head pulley and on thickness variations in the belt. An objective here is that the scraping edges should not come into contact with the belt, even when impacted by material on the belt, and despite relative movement of the surface 56 due to the aforementioned factors. Thus the scraping edges 48 do not normally contact the belt surface.

In use of the scraper arrangement the scraping elements 46 are used, as has been indicated, to remove bulky and sticky material from the outer surface. When this type of material strikes the scraping edges 48 the scraper assembly 30 is capable of removing the material due to its robust construction. If the material is particularly bulky and adheres with substantial force to tho outer surface 56 then a significant force is exerted on the scraping elements 46. This force may tend to rotate the arms about the axis 32. If this type of pivotal movement occurs then, due to the geometry of the assembly shown in FIG. 1 and described hereinbefore, the movement is in a clockwise direction about the axis 32 in FIG. 1 and, as a result, the scraping edges 48 are moved slightly away from the outer surface 56 and are not moved towards the outer surface. The likelihood of the belt being damaged by the edges 48 is therefore reduced but the ability of the scraping elements to remove material from the belt is not significantly impaired. Substantial amounts of material can therefore be dislodged from the belt by the scraper assembly.

A similar action arises if a joint or splice in the conveyor belt should become detached or protrude, for whatever reason, above the general plane of the belt, so that it comes into contact with the scraping edges 48. The edges are deflected and move away from the belt surface, reducing the likelihood of belt damage.

Any material remaining on the belt is removed, substantially in the normally manner, using a primary scraper or a secondary scraper, or both.

If the material on the belt is dry or, for any other reason does not adhere to the belt surface in a troublesome manner, then it is discharged from the belt in the normal way, following a trajectory which lies above the scraping elements. The scraper assembly of the invention then does little or no scraping action and the primary and secondary scrapers function as intended.

Figure 2:
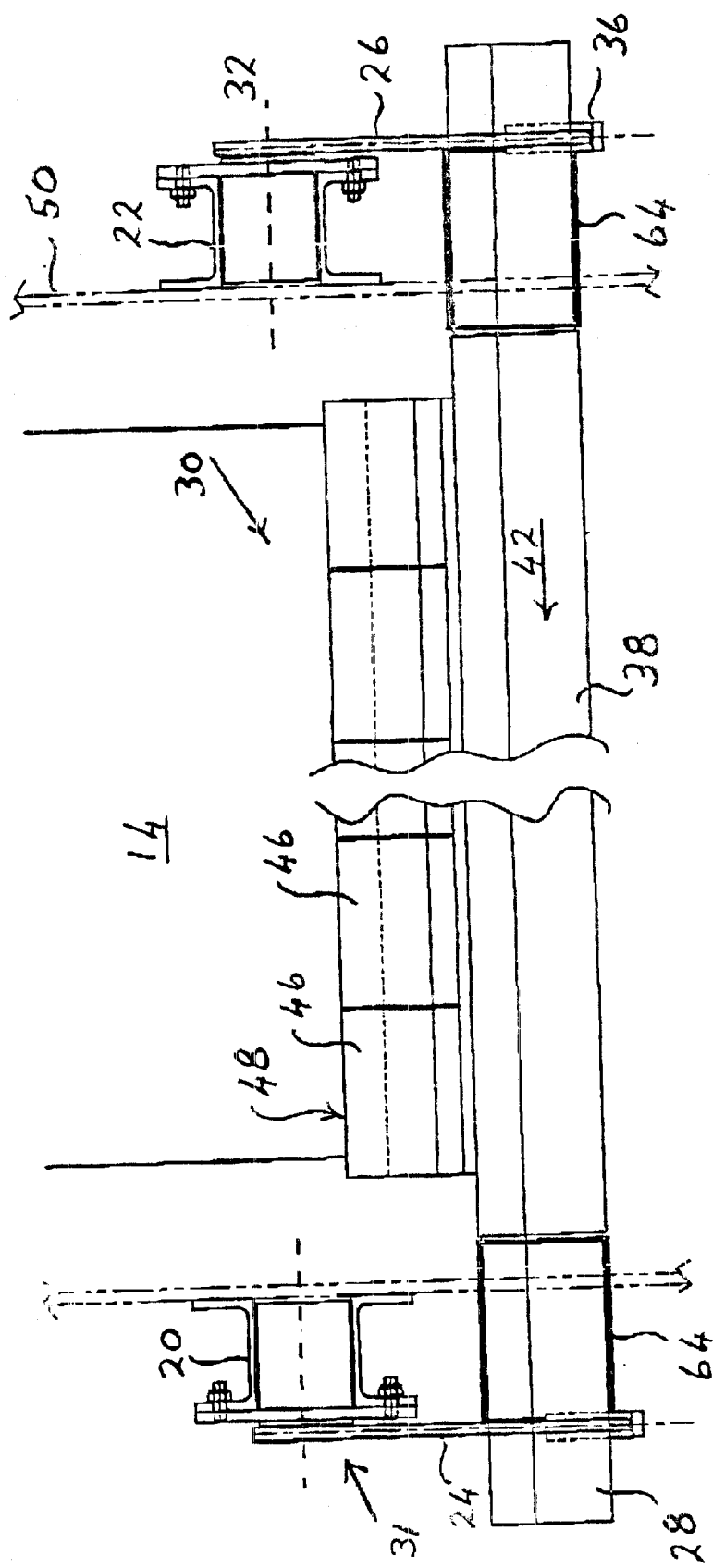
FIG. 2 is a view from the front of the scraper arrangement of FIG. 1, as seen in the direction of an arrow marked "2".

As has been noted the scraper assembly 30 is preferably assembled in a cartridge form so that when the scraping elements are worn it is possible to insert a fresh cartridge with relative ease. The bolts on one of the plates 52 are removed and a spacer 64 between opposing inner surfaces of the respective support arm and the base is removed. The spacers are shown in FIG. 2 and are used to ensure that the base 38 is correctly positioned, in a transverse direction, on the member 28. The base 38,can then be withdrawn with a sliding action from the member 28 and a fresh cartridge can be inserted. The respective spacer 64 is replaced and the arm which had been removed is then bolted to its support.

What is claimed is:

1. A scraper arrangement for a conveyor belt which passes around a head pulley, the scraper arrangement comprising:
   a plurality of scraping elements each with a scraping edge, the scraping elements being mounted opposing the belt as it passes around the head pulley and the scraping edges being positioned so that they do not contact the conveyor belt during operation of the belt;

at least two supports and at least two arms each of which is mounted for limited pivotal movement about an axis relatively to its support, the scraping elements being fixed directly or indirectly to the arms;

a member which extends transversely to the direction in which the belt moves and which is engaged with two of the said arms located respectively on opposing sides of the belt; and a base which is engageable with a sliding action with the member and a plurality of the said scraping elements being fixed to the base.

2. The scraper arrangement according to claim 1, wherein the base and the scraping elements are provided as a scraper assembly cartridge which has a bracing member which extends from the base and fixes the plurality of scraping elements to the base, and wherein the respective scraping edges of the scraping elements are on or below a line which extends radially from a centre of the head pulley to the said axis.

3. A scraper arrangement according to claim 2 wherein the base is channel shaped with opposing spaced lips.

4. A scraper arrangement according to claim 2 wherein the bracing member is rigid and the scraping elements are fixed in line with one another to the bracing member.

5. A scraper arrangement which includes a member, an elongate base which is slidingly engageable with the member, a plurality of scraping elements which are rigidly mounted, in line with one another, to the base, two support mechanisms which are spaced from each other, and two arms whereby opposed ends of the member are mounted to the support mechanisms which permit limited pivotal movement of the base relative to the support mechanisms.

6. The scraper arrangement according to claim 5, for use with a conveyor belt which passes around a head pulley, wherein each scraping element has a scraping edge, each scraping element being mounted opposing the belt as it passes around the head pulley and the scraping edge being positioned so that it does not contact the conveyor belt during operation of the belt.

7. A scraper arrangement according to claim 1 wherein the scraper edge is spaced from an outer surface of the conveyor belt by a maximum of about 6 mm.

8. A scraper arrangement according to claim 1 wherein the scraping edges of the scraping elements are positioned so that they are on or below a line which extends radially from the centre of the head pulley to the said axis.

9. A scraper arrangement according to claim 5 which includes a member which extends transversely to the direction in which the belt moves and which is engaged with the two arms located respectively on opposing sides of the belt.

10. A scraper arrangement according to claim 1 wherein the arms and the member are pivotal in unison about the said axis.

11. A scraper arrangement according to claim 1 wherein the base is in the shape of a channel and includes lips which enable the base to be engaged with a sliding action with the member but which prevent the base from being directly disengaged from the member by moving the base in a direction which is transverse to the direction in which the member extends.

12. A scraper arrangement according to claim 1 which includes means for adjusting the position of the axis relatively to the belt.

13. A scraper arrangement according to claim 5 which includes means for adjusting the angular orientation of the arms relatively to resilient support mechanisms.

14. A scraper arrangement according to claim 5 wherein the support mechanisms are resilient.

* * * * *